United States Patent Office

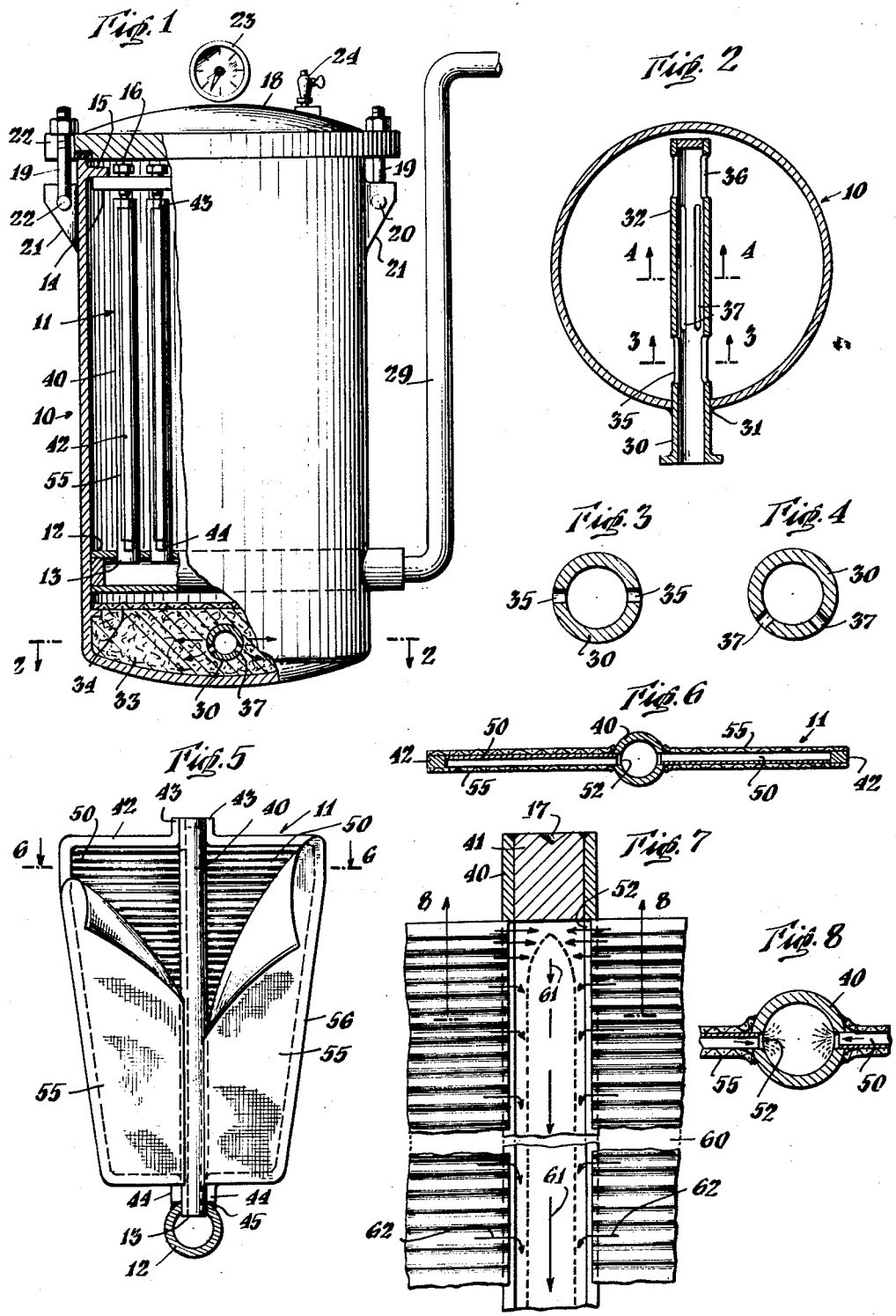

2,916,144
Patented Dec. 8, 1959

---

2,916,144

LIQUID FILTERING APPARATUS

Kurt Langnickel, Cedar Grove, N.J., assignor to Arvid Langnickel, Cedar Grove, N.J.

Application May 24, 1956, Serial No. 586,955

2 Claims. (Cl. 210—346)

The invention is concerned with an improved apparatus for filtering liquids. It is particularly concerned with a filtering apparatus employing filtering elements commonly designated a filter leaf and with features in connection therewith which contribute to the formation and maintenance of a filter cake of uniform thickness and thereby uniformity of conditions including liquid flow, and capable of performing filtering operations of exceptionally thorough and dependable character.

In the use of apparatus for filtering liquids which depends upon passing the liquid through a layer of finely divided material such as asbestos or kieselguhr it is necessary first to build up a layer of such material over the surface of the filter leaf. It is important not only that the initial deposited layer be uniform in thickness and character but also that it be maintained in such condition in the continued filtering operations.

Apparatus of the general type concerned normally and naturally involves characteristics and hydraulic phenomena tending to produce variations in pressure and in the path or concentration of flow of the liquid. The present invention provides an arrangement which compensates for and counteracts such tendencies and effects to a remarkable degree a uniform flow and distribution with correspondingly increased efficiency and uniformity of product. It includes features of construction of the filter leaf which contribute to such results and also other features which ensure that the liquid is brought to the filter leaf in an adequate quantity but in a uniformly moving mass free of localized currents and accordingly in a manner to assist in the uniform deposit of particles on the filter leaf and without localized erosion effects.

Other objects and advantages will be made more apparent from a consideration of the apparatus hereinafter described depicting one embodiment of the principles of the invention. The invention accordingly comprises the features of construction, combination of elements, and arrangement of parts, which will be exemplified in the construction hereinafter set forth, and the scope of the invention will be indicated in the claims.

Reference should be had to the following detailed description taken in connection with the drawings in which:

Fig. 1 is a view in elevation of a filter apparatus with a portion of the casing broken away to show inner elements;

Fig. 2 is a horizontal cross section taken on the line 2—2 of Fig. 1;

Figs. 3 and 4 are detail cross sections of the inlet pipe taken on the lines 3—3 and 4—4 respectively of Fig. 2;

Fig. 5 is a separate view of one of the filter leaves with portions of the outer screen covering rolled back to show the inner construction;

Fig. 6 is a cross sectional view of the filter leaf taken on the line 6—6 of Fig. 5;

Fig. 7 is a fragmentary vertical view with arrows indicating the flow of liquid within the filter leaf; and Fig. 8 is a fragmentary cross sectional view taken on the line 8—8 of Fig. 7.

Fig. 1 shows in general a filter apparatus in which the features and principles of the invention are embodied. The apparatus includes a main tank 10 having therein a plurality of filter leaves 11 supported on a lower cross tube 12, the filter leaves having lower pipe extensions 13 fitting into openings in the tube 12. The filter leaves are supported at their upper ends in any suitable manner. In the present construction it comprises a cross bar 14 engaging at its ends under lugs 15 projecting from the inner wall of the tank 10. Each filter leaf is engaged at its upper end by a set screw 16 threaded through the bar 14 and having a centering point engaged in a depression 17 (see Fig. 7) in the upper end of the central part of the filter leaf. The tank has a suitable cover 18 clamped in position by bolts 19 pivotally secured at 20 in ears 21 on the outer surface of the tank 10. The bolts extend through slots or holes 22 of the cover 19. The tank may be provided with the usual auxiliary equipment such as the gage 23 and release valve 24.

The filtrate collector pipe 12 communicates with an outlet pipe 29. The liquid to be filtered is supplied to the tank at the bottom thereof by means of a horizontally extending pipe 30 sealed into the lower portion of the tank in any suitable manner such as by the welding indicated at 31. As an important feature of the apparatus the inlet pipe section 32 within the tank is embedded in and surrounded by a mass of material 33 surmounted by a retaining screen 34. The material 33 may vary somewhat in character and composition but a particularly efficient nad effective material is steel wool. In general the material is of fine filament or fiber held together as a coherent mass surrounding the outlets of the pipe 32 and effective to diffuse the incoming stream of liquid into a wide body of liquid which moves upwardly into the tank to the filter leaves in a seeping fashion free of any definite streams or currents which would have an eroding effect on the filter cake coating the filter leaves. As an aid in avoiding localized streams or currents and increasing the diffusing effect, the outlets from the pipe 32 are directed away from the upper filter leaves or at least there are no outlets pointing directly upwardly. To that end it may be noted that the pipe section 32 has a plurality of slotted openings which at the section of Fig. 2, shown in Fig. 3, comprise slots 35 located to discharge in a horizontal direction. If desired a second set of similar slots may be provided as shown at 36 in Fig. 2. At the intermediate section indicated by Fig. 4 the slots 37 are arranged to discharge in a different radial direction which is somewhat downwardly below the horizontal.

Turning now to the filter leaves as shown in more detail in Figs. 5 and 6, each filter leaf includes a hollow center post or column 40 sealed at the upper end in any suitable manner as for example by a plug 41 as indicated in Fig. 7. The column 40 has a central opening for the flow of liquid downwardly therein adapted to discharge into the bottom cross pipe 12. As indicated the filter leaves are preferably symmetrical with wing portions on each side of the center of the column 40, but if desired they may have a single wing only. The wing portions are formed by a suitably shaped bar 42 which may be rectangular in cross section as indicated in Fig. 6. The bar is secured to the center column 40 in any convenient manner such as by the provision of a bent portion 43 welded to the upper end of the column 40 as indicated in Fig. 5 and by a similar bent portion 44 welded to the column at the lower end. Conveniently the portions 44 provide a shoulder or stop for engaging a suitable supporting seat on the horizontal discharge pipe 12 as indicated at 45 in Fig. 5.

Mounted within each of the wing frame parts 42 is a grid section 50. These inner grids may vary somewhat in character but it is important that they provide unobstructed free channels for conducting liquid inwardly into the interior of the column 40. A corrugated sheet material is particularly effective for the purpose with the corrugations extending radially of the column and preferably horizontal. The sections 50 are shaped to fit and are secured within the supporting frame 42 and the inner edge of the respective sections may extend slightly into the slots 52 provided in the column 40, but in any event should terminate short of the interior vertical passage in the column 40.

Secured to the sides of the wing portions of the filter leaf is a suitable fine mesh sheet material 55. The character of the sheet material may vary somewhat and may comprise for example a very fine mesh metal wire screen. In Fig. 5 the outer sheet material has been folded back at the upper portions, but it will be understood that normally the sheet material lies flat against the supporting grid 50 and is fully sealed around the edges so that liquid being filtered must pass through the screen 55.

As indicated particularly in Fig. 5 the width or radial extent of the wing sections increases upwardly from the bottom. In Fig. 5 this is shown as a straight edge section 56 although it will be understood that it need not necessarily be shaped as a straight line but may be curved somewhat. The net effect is that the flow areas and the length of the horizontal channels in the grid sheets 50 are less at the bottom and progressively increase upwardly. Dependent upon circumstances the progressive increase in width may be carried upwardly to different heights but in any case should be for at least the major portion of the height.

The construction and relation are of importance in effecting and maintaining a uniform filter cake deposit over the areas of the filter leaves and in maintaining a uniform distribution of flow and character of filtering. The arrangement in general compensates for certain characteristics inherent in a device of the type concerned including such phenomena as the difference in pressure head at different levels and the effect of velocity of the liquid and merging streams. The operating characteristics and advantages of the filter leaf of the present invention are indicated somewhat diagrammatically in Figs. 7 and 8. It will be understood that the height of filter leaves may vary considerably dependent upon circumstances, and may range from a relatively small size to larger ones several feet in height. A filter leaf two feet in height is representative. In Fig. 7 the leaf is shown broken at 60 to indicate better that the height may be greater than may otherwise appear from the figure.

The flow of liquid in the vertical tube 40 from the upper horizontal channels of the filter leaf down past the outlets from lower horizontal channels occurs with increasing volume and at increasing velocity due to gravity. The increasing volume and velocity or tendency thereto is represented in Fig. 7 by the increasing length of the successive arrows 61. The downward flowing liquid produces a frictional drag and suction on the outlets and streams of liquid entering the tube 40 from the lower horizontal channels indicated by the arrows 62. This frictional drag and suction together with the effect of a higher pressure head on the outside of the filter leaves in the tank at their lower areas tends to cause a greater flow in the lower horizontal channels which tends to build up a thicker layer of filter cake in the lower areas. At the same time the increased flow from the lower horizontal channels into the vertical tube produces a mass of liquid at the lower portion of the vertical tube which chokes off the flow from the upper part and the upper horizontal channels and correspondingly restricts and reduces the flow from the upper channels which also tends to keep the filter cake at the upper areas of the filter leaves thinner than over the lower areas. The arrangement and relations of the filter leaf of the present invention compensate for the above conditions particularly by having the lower channels shorter and increasing in length progressively upwardly. In general the aggregate discharge of liquid into the vertical channel decreases progressively downwardly. As a consequence the liquid flow per unit of area in the lower parts of the filter leaves is substantially the same as for the upper areas, and an initial filter cake is built up of uniform thickness and the uniformity is maintained through subsequent filtering operations. A uniform filter cake and uniform flow distribution means a uniform product and a capacity for longer operation.

The manner in which the liquid is supplied to the filter leaves as previously described is an important factor in maintaining the conditions. The liquid is diffused upwardly from the supply in a uniformly moving mass which is free of any localized streams or currents which would have an eroding effect or favor some sections of the filter leaves more than others.

Since certain changes may be made in the above construction without departing from the scope of the invention, it is intended that all matter contained in the above description or shown in the accompanying drawings shall be interpreted as illustrative and not in a limiting sense.

I claim:

1. A filter apparatus having in combination a tank, a plurality of spaced filter leaves each vertically arranged therein and each comprising a hollow vertical generally cylindrical supporting member with an outer wall providing a conduit for the downward flow of liquid and having a liquid outlet at the bottom of said member, said member having a pair of opposed longitudinally extending vertical slots in said wall, and said member being of substantially uniform diameter internally and externally over the portion corresponding to said vertical slots, a corrugated sheet section secured to said member at each said slot and extending radially therefrom with corrugations extending radially from said member and providing channels terminating short of the hollow interior of said member for liquid flow communicating through the respective slot with said hollow interior of said member, and fine mesh sheet material secured to each of said sections and covering the sides thereof, the channels adjacent the bottom being shorter with respect to the radial extent from the center of said cylindrical member and from the outer surface thereof and progressively increasing in length upwardly for the major portion at least of the height of the respective section thereby to reduce progressively the amount of liquid entering the said vertical conduit from the lower channels relative to the upper channels.

2. A filter apparatus having in combination a tank, a plurality of spaced filter leaves each vertically arranged therein and each comprising a hollow vertical generally cylindrical supporting member with an outer wall providing a conduit for the downward flow of liquid and having a liquid outlet at the bottom of said member, said member having a pair of opposed longitudinally extending vertical slots in said wall, and said member being of substantially uniform diameter internally and externally over the portion corresponding to said vertical slots, a corrugated sheet section secured to said member at each said slot and extending radially therefrom with corrugations extending radially from said member and providing channels for liquid flow communicating through the respective slot with said hollow interior of said member, and fine mesh sheet material secured to each of said sections and covering the sides thereof, the channels adjacent the bottom being shorter with respect to the radial extent from the outer surface of said cylindrical member and progressively increasing in length upwardly for the major portion at least of the height of the respective section thereby to reduce progressively the amount of liquid entering the said vertical conduit from the lower channels relative to the upper channels.

References Cited in the file of this patent

UNITED STATES PATENTS

| | | |
|---|---|---|
| 2,035,851 | Walker | Mar. 31, 1936 |
| 2,101,961 | Slidell | Dec. 14, 1937 |
| 2,426,618 | Klein | Sept. 2, 1947 |
| 2,468,296 | Jacobowitz et al. | Apr. 26, 1949 |
| 2,547,205 | Hallander | Apr. 3, 1951 |
| 2,625,273 | Schuller | Jan. 13, 1953 |
| 2,691,445 | Eickemeyer | Oct. 12, 1954 |
| 2,693,882 | Olson | Nov. 9, 1954 |